United States Patent [19]
Vaseloff

[11] Patent Number: 6,116,154
[45] Date of Patent: Sep. 12, 2000

[54] FOOD PAN MANAGEMENT SYSTEM IN FOOD WARMING APPARATUS

[75] Inventor: Dennis J. Vaseloff, Gurnee, Ill.

[73] Assignee: Prince Castle Inc., Carol Stream, Ill.

[21] Appl. No.: 09/371,482

[22] Filed: Aug. 10, 1999

[51] Int. Cl.[7] .............................. A23L 1/00; A47J 37/00
[52] U.S. Cl. ................. 99/483; 99/426; 99/448; 99/467; 99/476; 219/214; 219/400; 312/236
[58] Field of Search .............................. 99/330–333, 339, 99/340, 342, 370, 426, 447, 448, 467–476, 483, 485, 451, DIG. 14; 126/369, 377, 378; 211/181.1; 392/449, 459; 219/392–396, 214, 400, 385–387, 626, 620–622; 322/236; 165/61, 63, 64, 48.1, 267, 201, 918, 919; 426/237, 520–523; 312/236

[56] References Cited

U.S. PATENT DOCUMENTS

| | | | |
|---|---|---|---|
| 4,517,446 | 5/1985 | Torning | 219/386 |
| 4,605,267 | 8/1986 | Rinkewich | 312/236 |
| 4,835,368 | 5/1989 | Fortmann et al. | 219/401 |
| 4,891,498 | 1/1990 | Fortmann et al. | 126/20 |
| 4,939,987 | 7/1990 | Smith | 99/468 |
| 5,025,132 | 6/1991 | Fortmann et al. | 392/399 X |
| 5,132,520 | 7/1992 | Blanton et al. | 219/400 |
| 5,209,941 | 5/1993 | Wuest | 426/510 |
| 5,285,051 | 2/1994 | DeGrow et al. | 219/386 |
| 5,365,039 | 11/1994 | Chaudoir | 99/468 |
| 5,449,232 | 9/1995 | Westbrooks, Jr. et al. | 312/236 X |
| 5,454,427 | 10/1995 | Westbrooks, Jr. et al. | 165/918 X |
| 5,520,102 | 5/1996 | Monetti | 99/483 |

*Primary Examiner*—Timothy Simone
*Attorney, Agent, or Firm*—John R. Hoffman

[57] ABSTRACT

A system is provided for manually manipulating a food pan in a food warming apparatus having an open front end communicating with an interior warming compartment. A wire form pan holder cradles the food pan and moves the pan into and out of the warming compartment through the open end of the warming apparatus. A wire form grate is provided in the warming compartment for guiding the pan holder into and out of the compartment. The pan holder has a handle projecting forwardly thereof. First complementary interengaging stops between the wire form grate and the wire form pan holder define an inner position of the pan holder. Second complementary interengaging stops between the grate and the pan holder define an outer position of the pan holder.

18 Claims, 4 Drawing Sheets

FOOD PAN MANAGEMENT SYSTEM IN FOOD WARMING APPARATUS

FIELD OF THE INVENTION

This invention generally relates to the art of food preparation and, particularly, to a management system that allows for manually manipulating a food pan for containing food products in a food warming apparatus.

BACKGROUND OF THE INVENTION

Various types of ovens or food warming apparatus are used in a wide variety of applications, particularly in food preparing and distribution fields. Such apparatus may range from a completely closed oven to an open-front oven to a pass thru oven which is open at both its front and rear ends. For instance, in high volume restaurants or similar establishments, various menu items are precooked, and the precooked items are held in warming ovens to maintain the temperature of the items for serving to a customer shortly thereafter. An example is a common sandwich. The sandwich may include a meat component and a bread component, with the meat component being precooked and the bread component being pre-toasted, for instance. These precooked components are temporarily held in separate pans which are placed in ovens within which the temperatures of the components are maintained until the components are assembled and prepared as the final menu item for serving to the customer. The ovens sometimes are called staging cabinets or holding cabinets. They do not heat the precooked food components up to a given temperature, but they maintain or hold the prescribed precooked temperature of the components.

One of the problems in using food warming apparatus of the character described above is that the food pans which contain the food products in a food warming apparatus may become very hot to the touch of a worker. The food warming compartments of the warming apparatus also may be bounded by upper and/or lower heating surfaces. The food pans typically have only small lips to grasp for moving the pans into and out of the warming compartments, and workers can burn their hands or fingers simply by slipping off of the lip of the food pan even if they originally establish a good grip.

The present invention is directed to solving these problems and providing improvements in such food warming apparatus, particularly in providing a management system for manually manipulating the food pans without risking burns or associated problems.

SUMMARY OF THE INVENTION

An object, therefore, of the invention is to provide a new management system for manually manipulating a food pan for containing food products in a food warming apparatus having an open front end communicating with an interior warming compartment.

In the exemplary embodiment of the invention, the system includes a wire form pan holder for cradling the food pan and moving the pan into and out of the interior warming compartment through the open front end of the food warming apparatus. A manually graspable handle projects forwardly of the wire form pan holder. A wire form grate is provided in the warming compartment for guiding the wire form pan holder into and out of the compartment. First complementary interengaging stop limit means are provided between the wire form grate and the wire form pan holder for defining an inner position of the pan holder and, therefore, the pan within the warming compartment. Second complementary interengaging stop limit means are provided between the wire form grate and the wire form pan holder for defining an outer position of the pan holder and, therefore, the pan outside the warming compartment.

As disclosed herein, the wire form grate includes side guide rails for guiding the wire form pan holder into and out of the warming compartment. The pan holder is generally rectangularly shaped with side wire sections and end wire sections. The manually graspable handle is provided by a generally U-shaped wire section projecting forwarding of one of the end wire sections. Both the first and second complementary interengaging stop limit means include portions of the side wire sections of the pan holder.

It is contemplated that the warming apparatus may be a pass thru-type oven with both front and rear open ends. The wire form pan holder, correspondingly, has one of the manually graspable handles at each opposite end thereof. The first and second complementary interengaging stop limit means are functional in either direction of pulling the pan holder out of the warming compartment from either the front or rear open ends thereof.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
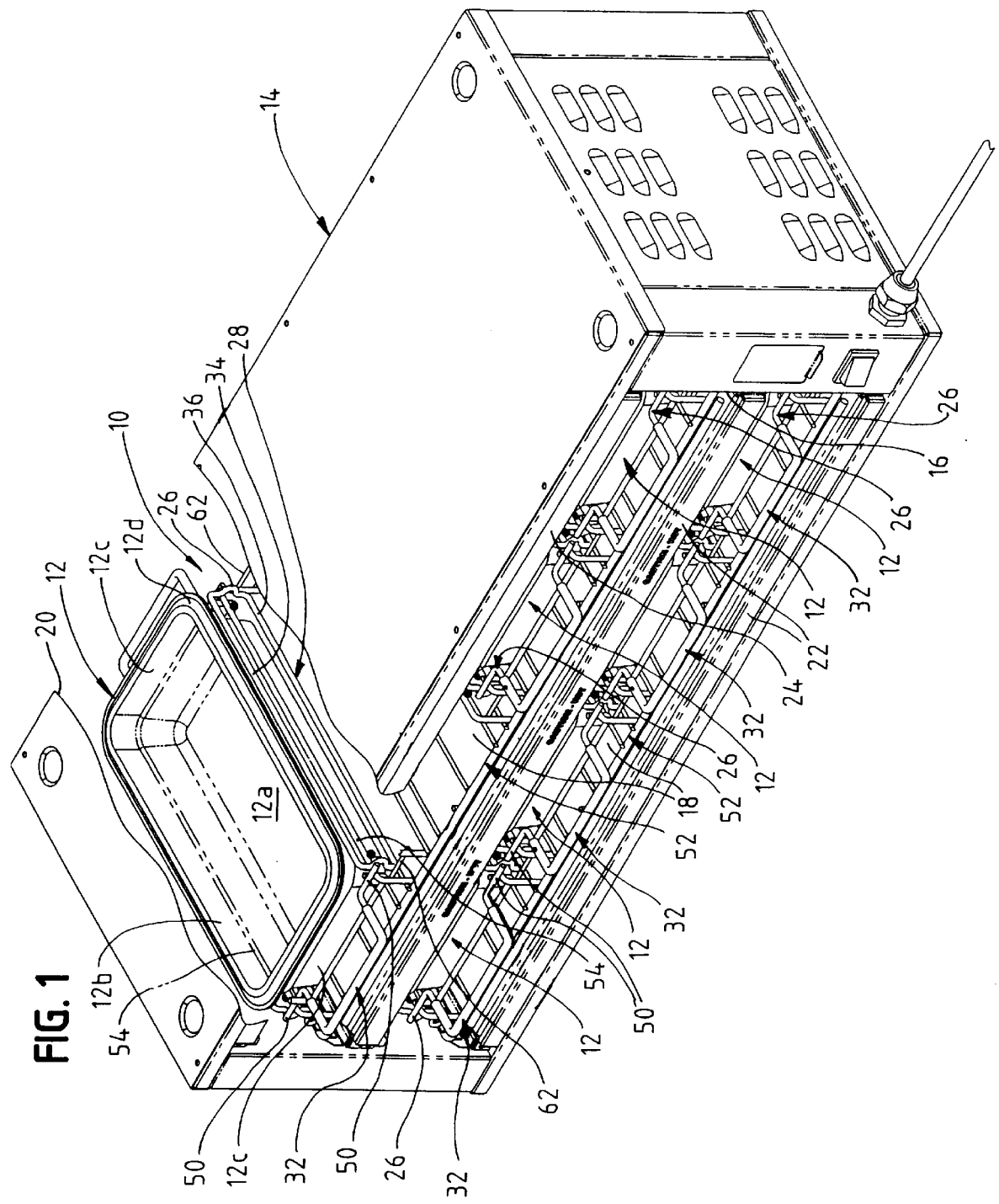
FIG. 1 is a perspective view of a food warming apparatus incorporating the system of the invention, partially cut-away to show one of the food pans in its inner position.
Figure 2:
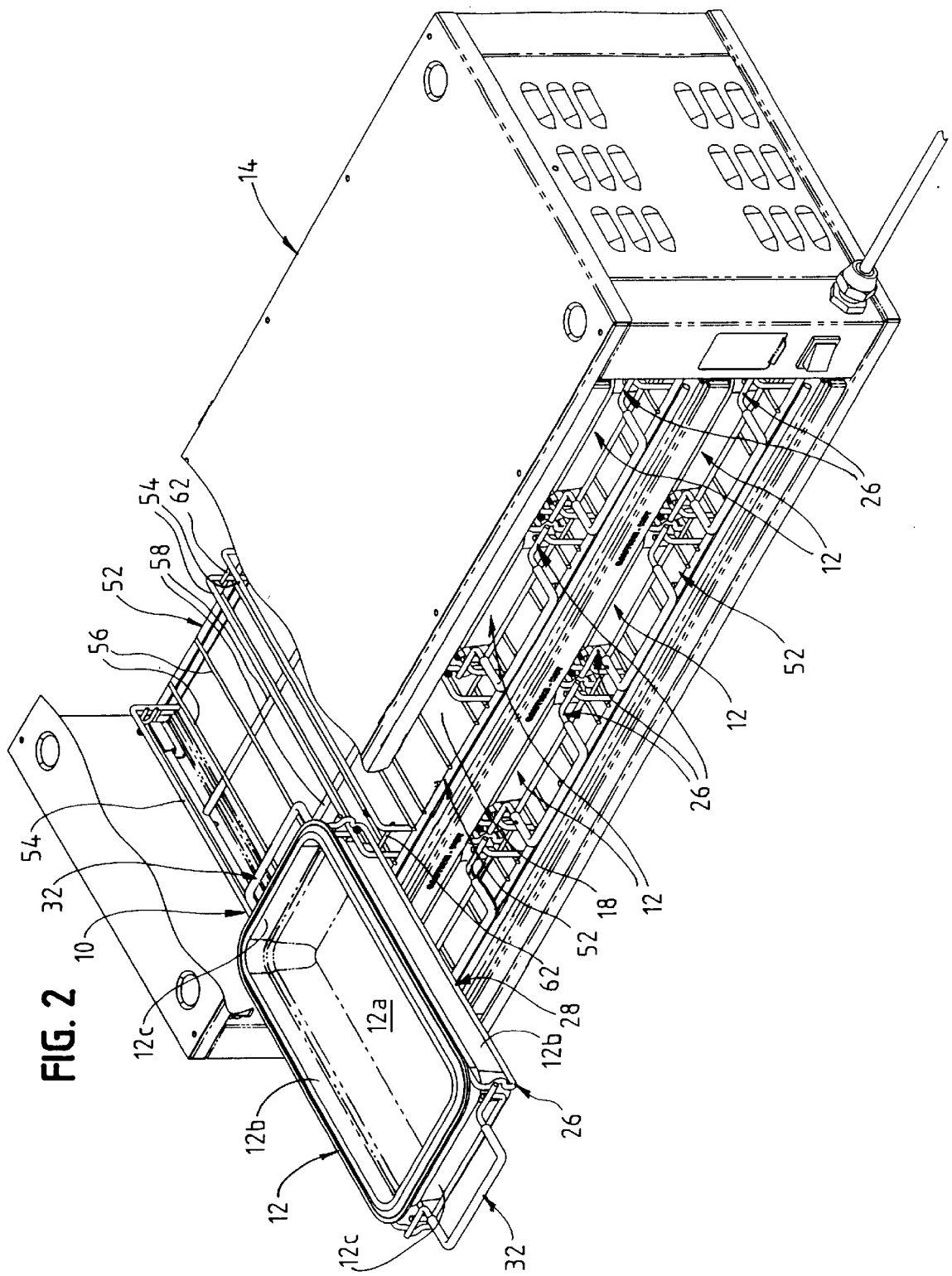
FIG. 2 is a view similar to that of FIG. 1, with the one food pan in its outer position.

Referring to the drawings in greater detail, and first to FIGS. 1 and 2, the invention is embodied in a management system, generally designated 10, for manually manipulating a food pan, generally designated 12, for containing food products in a food warming apparatus, generally designated 14. The apparatus includes an open front end 16 communicating with an interior warming compartment 18.

Actually, food warming apparatus 14 is of the pass thru-type and includes both open front end 16 and an open rear end 20. The apparatus has a pair of heating surfaces or platforms 22 which divide the apparatus into upper and lower interior warming compartments 18. A heating plate 24 may form the top of the upper food warming compartment. The compartments are wide enough to accommodate four food pans 12 in each compartment (i.e., eight food pans total for the apparatus). In FIGS. 1 and 2, the food pan which would be the pan second from the left in the upper compartment, has been removed to facilitate the illustration.

Before proceeding with a detailed description of the inventive concepts, it should be understood that food pan 12 is of a typical or conventional construction. The pan is fabricated of plastic or like material which, preferably, is transparent so that the interior contents thereof can be visualized through the pan. The pan is generally rectangular as defined by a pair of longer side walls 12b and a pair of shorter end walls 12c. An outwardly projecting peripheral flange or lip 12d extends around the top of the pan and is the primary means by which a worker grips and manipulates the pan.

Figure 3:
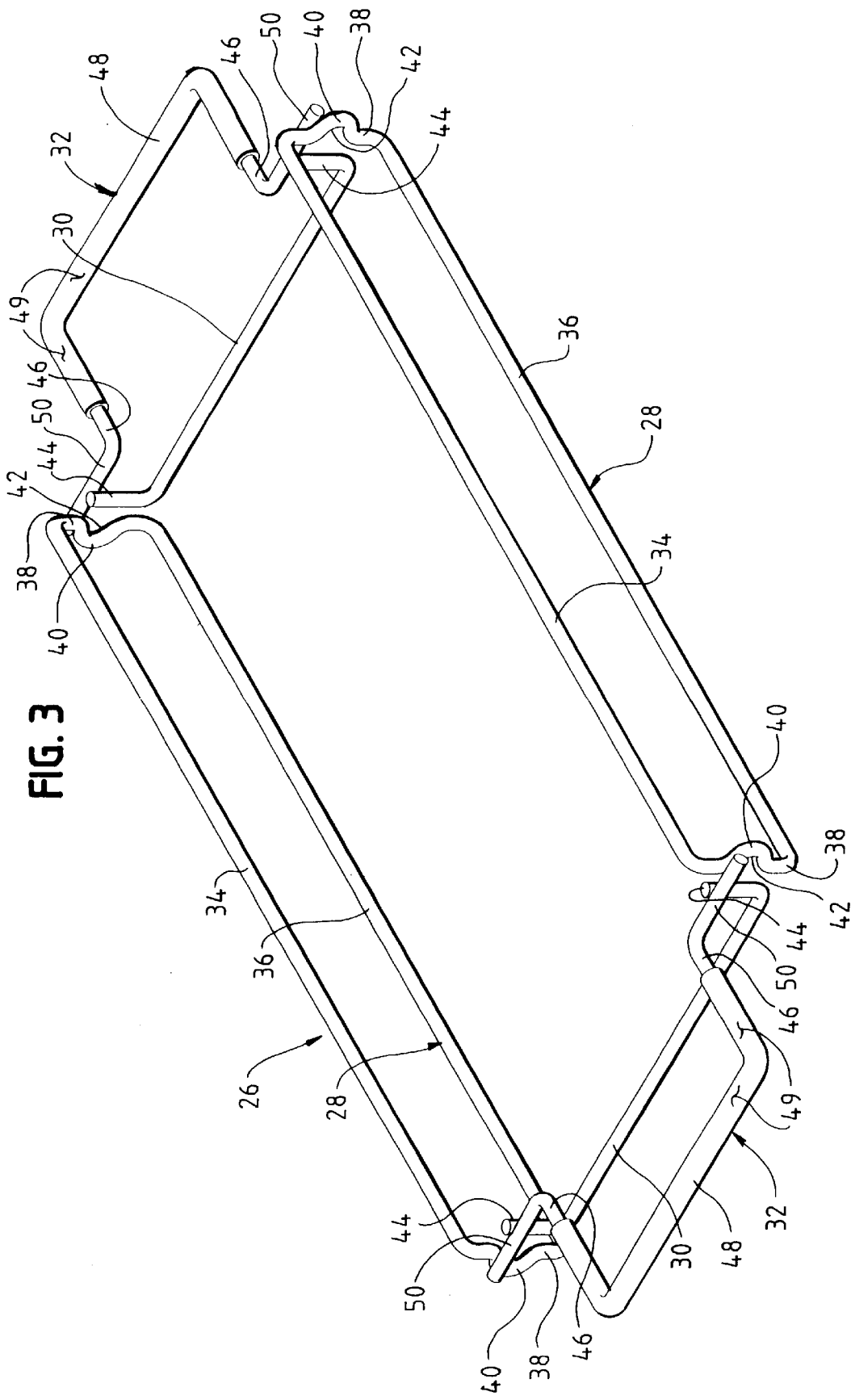
FIG. 3 is an enlarged perspective view of the wire form pan holder.

FIG. 3 shows an enlarged depiction of a wire form pan holder, generally designated 26, according to the invention. The pan holder is generally rectangular and includes a pair of longer wire form side sections, generally designated 28, and a pair of shorter U-shaped wire form end sections 30. The side sections and end sections are dimensioned to cradle one of the food pans 12 therewithin, with the peripheral lip 12d which extends along side walls 12b of the pan resting on top of side sections 28 of wire form pan holder 26. A generally U-shaped wire form handle, generally designated 32, projects forwardly and rearwardly from opposite ends of the pan holder.

Each wire form side section 28 includes an upper longitudinal wire 34 and a lower longitudinal wire 36. The upper and lower longitudinal wires are joined at adjacent ends by vertical wires 38 having outwardly bowed portions 40 which define inner concave recesses 42.

Each wire form end section 30 of pan holder 26 is generally U-shaped and includes a pair of vertical end portions 44. The vertical end portions generally are in transverse alignment with vertical wires 38 of wire form side sections 28.

Each wire form handle 32 is generally U-shaped to define a pair of leg portions 46 joined by a cross portion 48 which is graspable by a person. The cross portion and a majority of the leg portions can be covered by a sheath 48 of insulating material, such as plastic or the like. A horizontal end portion 50 projects outwardly from each leg portion 46 of each wire form handle. The entire wire form pan holder 26 is secured in assembly by fixing end portions 50 of handle 32 to vertical wires 38 of side sections 28 and to vertical end portions 40 of end sections 30 by spot welding or the like. As used herein, "wire form" not only is meant to cover metal wire-like components but such structures as bar stock, high temperature plastic, or the like.

As seen in FIGS. 1 and 2, one of the wire form pan holders 26 is used for each of the eight food pans 12 within food warming apparatus 14. The wire form pan holders and pans are guided into and out of interior warming cavities 18 by a wire form grate, generally designated 52, disposed in the bottom of each warming compartment. As will seen and described hereinafter, the wire form grates also are effective to cooperate with wire form pan holders 26 to define inner and outer stop limit positions of the pan holders and, therefore, the pans within the warming cavities.

Figure 4:
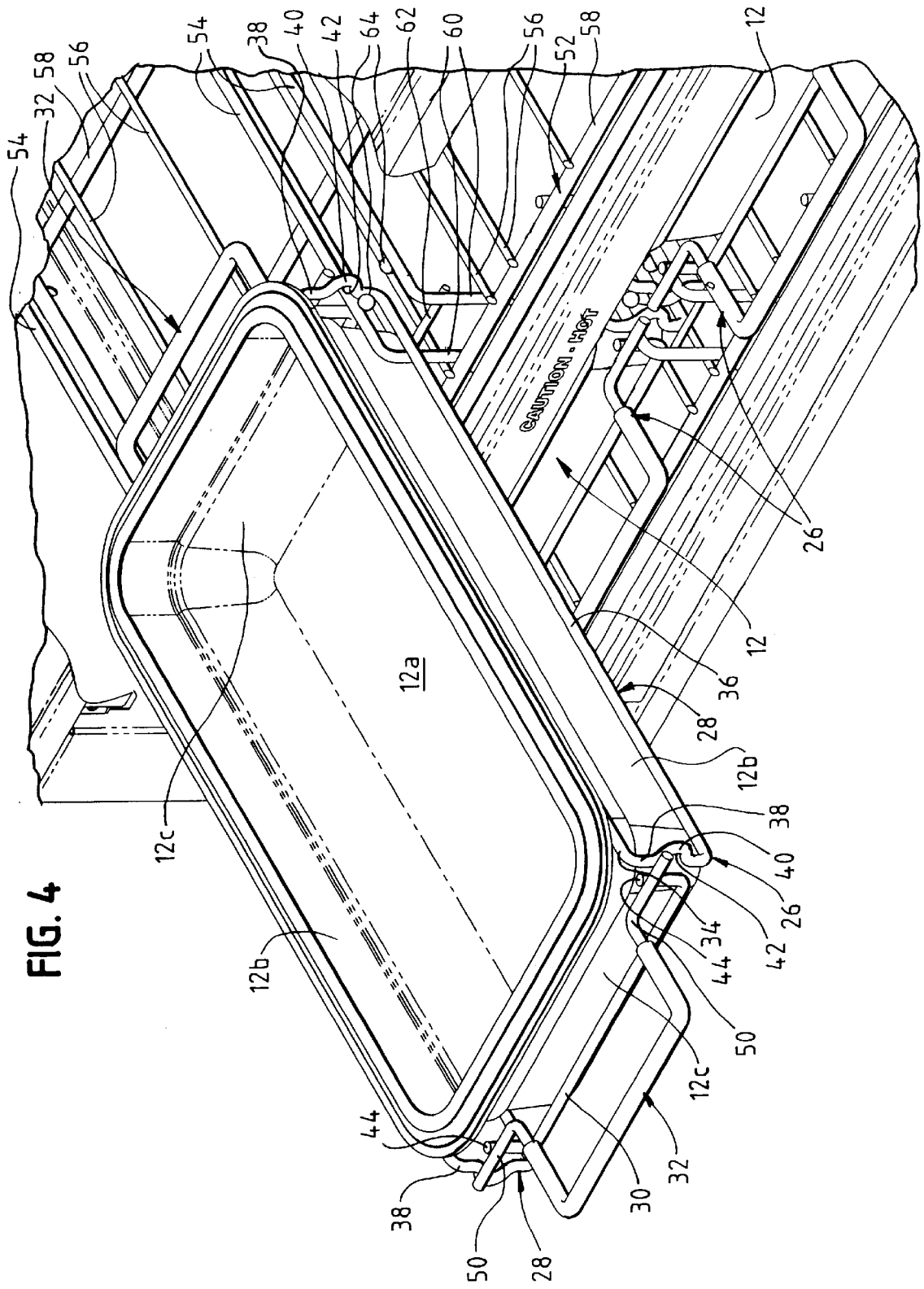
FIG. 4 is an enlarged fragmented perspective view of the food pan in its outer position of FIG. 2.

Referring to FIG. 4 in conjunction with FIGS. 1–3, each wire form grate 52 includes a guide rail 54 which runs longitudinally on each Referring to FIG. 4 in conjunction with FIGS. 1–3, each wire form grate 52 includes a guide rail 54 which runs longitudinally on each opposite side of each wire form pan holder 26 as the guide rails or wires guide the pan holders and pans into and out of the warming compartments. Guide rails 54 are raised above a network of front-to-rear support wires 56 and transverse or laterally extending support wires 58 which form sort of a supporting grid for the wire form grate. Guide rails 54 are elevated above this supporting grid and, in essence, divide each warming compartment 18 into four discrete warming areas. In other words, as seen best in FIG. 2, a pair of generally parallel guide rails 54 form sort of a partition between each of the four warming areas of each warming compartment 18.

Each guide rail 54 of each wire form grate 52 has a vertical wire or leg 60 extending downwardly from each opposite end thereof, as is clearly seen in FIG. 4. A cross wire or brace 62 joins the vertical wires of an adjacent pair of guide rails 54. Lastly, a stop ball 64 is secured to the outside of each guide rail 54 near each opposite end thereof, again as is clearly seen in FIG. 4. Guide rails 54, support wires 56 and 58, cross wires 62 and stop balls 64 of each wire frame grate 52 all are secured in assembly as shown by spot welding or the like.

In operation, each wire form pan holder 26 is positioned for movement into and out of one of the warming compartments of food warming apparatus along guide rails 54 of one of the wire form grates 52. Side sections 28 (FIG. 3) of the pan holder are located outside a pair of the guide rails 54 as can be seen in FIGS. 1, 2 and 4. Lower longitudinal wires 36 of side sections 28 ride on top of cross wires 62 as the pan holder is moved into and out of the warming cavity.

When the pan holder is pushed into the warming cavity, first complementary interengaging stop limit means are provided between the wire form grate and the wire form pan holder for defining a inner position of the pan holder and, therefore, the pan within the warming cavity. This first stop limit means is provided by the inner-most vertical wires 38, below outward bowed portions 40, of side sections 28 abutting against the innermost cross wire 62 (FIG. 1) of the wire form grate. Once the pan holder is pushed to its fully inner position as shown in FIG. 1, outer-most vertical wires 38, below outward bowed portions 40, of side sections 28 prevent the tray from being pulled forwardly out of the warming compartment. In essence, when the pan holder is in its full inner position, wire form side sections 28 drop between cross wires 62 to establish a finite position for the pan holder and pan. In this position, end portions 50 (FIG. 3) of handles 32 rest on top of guide rails 54 as can be seen in FIG. 1.

In order to pull pan holder 26 and pan 12 out of its respective warming compartment, front handle 32 is lifted upwardly so that vertical wires 38 at the front of side sections 28 clear cross wires 62 of wire form grate 52. The pan holder and pan then can be pulled outwardly as lower longitudinal wires 36 of the pan holder ride on cross wires 62.

Generally, second complementary interengaging stop limit means are provided between each wire form pan holder 26 and the respective wire form grate 52 for defining an outer position of the pan holder and, therefore, the pan outside the warming compartment. This outer position is shown in FIGS. 2 and 4. This second stop limit means is provided in the form of stop balls 64 which will engage the rear-most vertical wires 38 of the pan holder below outwardly bowed portions 40 as can be seen clearly in the enlarged depiction of FIG. 4. The weight of the pan holder and/or the pan maintains the stop balls against the vertical wires of the pan holder.

If it is desired to completely remove the pan holder from the food apparatus, the front of the pan holder is lifted upwardly from the position shown in FIG. 4, until stop balls 64 become aligned with inner concave recesses 42 within outwardly bowed portions 40. The balls then can pass through recesses 42 and the entire pan holder and/or pan can be removed from the apparatus.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A system for manually manipulating a food pan for containing food products in a food warming apparatus having an open front end communicating with an interior warming compartment, comprising:

a wire form pan holder for cradling the food pan and moving the pan into and out of the interior warming compartment through the open front end of the food warming apparatus;

a manually graspable handle projecting forwardly of said wire form pan holder;

a wire form grate in the warming compartment for guiding the wire form pan holder into and out of the compartment;

first complementary interengaging stop limit means between the wire form grate and the wire form pan holder for defining an inner position of the pan holder and, therefore, the pan within the warming compartment; and second complementary interengaging stop limit means between the wire form grate and the wire form pan holder for defining an outer position of the pan holder and, therefore, the pan outside the warming compartment.

2. The system of claim 1 wherein said manually graspable handle comprises a generally U-shaped wire section of the wire form pan holder.

3. The system of claim 2 wherein said warming compartment has both front and rear open ends, and the wire form pan holder has one of said manually graspable handles at each opposite end thereof.

4. The system of claim 1 wherein said wire form grate includes side guide rails for guiding the wire form pan holder into and out of the warming compartment.

5. The system of claim 1 wherein said wire form pan holder is generally rectangularly shaped with side wire sections and end wire sections, with said manually graspable handle projecting forwardly of one of the end wire sections.

6. The system of claim 5 wherein said manually graspable handle comprises a generally U-shaped wire section of the wire form pan holder.

7. The system of claim 5 wherein said first complementary interengaging stop limit means include portions of the side wire sections of the pan holder.

8. The system of claim 5 wherein said second complementary interengaging stop limit means include portions of the side wire sections of the pan holder.

9. The system of claim 8 wherein said second complementary interengaging stop limit means include portions of the side wire sections of the pan holder.

10. A system for manually manipulating a food pan for containing food products in a food warming apparatus having an open front end communicating with an interior warming compartment, comprising:

a wire form pan holder for cradling the food pan and moving the pan into and out of the interior warming compartment through the open front end of the food warming apparatus;

a manually graspable handle projecting forwardly of said wire form pan holder;

a support means in the warming compartment for guiding the wire form pan holder into and out of the compartment;

first complementary interengaging stop limit means between the support means and the wire form pan holder for defining an inner position of the pan holder and, therefore, the pan within the warming compartment; and second complementary interengaging stop limit means between the support means and the wire form pan holder for defining an outer position of the pan holder and, therefore, the pan outside the warming compartment.

11. The system of claim 10 wherein said manually graspable handle comprises a generally U-shaped wire section of the wire form pan holder.

12. The system of claim 11 wherein said warming compartment has both front and rear open ends, and the wire form pan holder has one of said manually graspable handles at each opposite end thereof.

13. The system of claim 10 wherein said support means includes side guide rails for guiding the wire form pan holder into and out of the warming compartment.

14. The system of claim 10 wherein said wire form pan holder is generally rectangularly shaped with side wire sections and end wire sections, with said manually graspable handle projecting forwardly of one of the end wire sections.

15. The system of claim 10 wherein said first complementary interengaging stop limit means include portions of the side wire sections of the pan holder.

16. The system of claim 10 wherein said second complementary interengaging stop limit means include portions of the side wire sections of the pan holder.

17. A system for manually manipulating a food pan for containing food products in a food warming apparatus having an open front end communicating with an interior warming compartment, comprising:

a wire form pan holder for cradling the food pan and moving the pan into and out of the interior warming compartment through the open front end of the food warming apparatus, including a pair of laterally spaced side wire sections, a pair of front and rear end wire sections joined to the side wire sections to form a generally rectangular configuration for cradling the food pan, a wire form handle projecting forwardly of one of the end wire sections for manually grasping the pan holder by a user, first stop means to facilitate defining an inner position of the pan holder and, therefore, the pan within the warming compartment, and second stop means for facilitating and defining an outer position of the pan holder and, therefore, the pan outside the warming compartment.

18. The system of claim 17 wherein said warming compartment has both front and rear open ends, and the wire form pan holder has one of said manually graspable handles at each opposite end thereof, along with one of said first and second stop means to define inner and outer positions of the pan holder in opposite directions.

\* \* \* \* \*